United States Patent
Hansson

(10) Patent No.: US 11,608,284 B2
(45) Date of Patent: Mar. 21, 2023

(54) SYSTEM AND A METHOD FOR WASHING ITEMS

(71) Applicant: SWATAB SCANDINAVIAN WATER TECHNOLOGY AB, Malmö (SE)

(72) Inventor: Per Hansson, Everöd (SE)

(73) Assignee: SWATAB SCANDINAVIAN WATER TECHNOLOGY AB, Malmö (SE)

( * ) Notice: Subject to any disclaimer, the term of this patent is extended or adjusted under 35 U.S.C. 154(b) by 267 days.

(21) Appl. No.: 16/500,201

(22) PCT Filed: Apr. 6, 2018

(86) PCT No.: PCT/EP2018/058868
§ 371 (c)(1),
(2) Date: Oct. 2, 2019

(87) PCT Pub. No.: WO2018/185289
PCT Pub. Date: Oct. 11, 2018

(65) Prior Publication Data
US 2020/0256003 A1 Aug. 13, 2020

(51) Int. Cl.
*D06F 39/10* (2006.01)
*D06F 58/20* (2006.01)
(Continued)

(52) U.S. Cl.
CPC .............. *C02F 9/00* (2013.01); *D06F 35/006* (2013.01); *C02F 1/001* (2013.01); *C02F 1/281* (2013.01);
(Continued)

(58) Field of Classification Search
CPC .. C02F 9/00; C02F 1/001; C02F 1/281; C02F 1/42; C02F 1/441; C02F 2001/422;
(Continued)

(56) References Cited

U.S. PATENT DOCUMENTS 4,975,199 A * 12/1990 Woster ................. B01D 61/022
210/638
6,099,735 A 8/2000 Kelada
(Continued)

FOREIGN PATENT DOCUMENTS

DE 3513940 A1 12/1985
DE 29809450 U1 9/1999
(Continued)

OTHER PUBLICATIONS

International Search Report and Written Opinion for corresponding International Application PCT/EP2018/058868 dated Jul. 5, 2018.

*Primary Examiner* — Matthew O Savage
(74) *Attorney, Agent, or Firm* — Renner, Otto, Boisselle & Sklar, LLP

(57) ABSTRACT

A system (10) for washing items (12) with purified water alone, comprising a washing machine (11), a water purification apparatus (19), and a reservoir (20) for storing purified water, wherein the water purification apparatus (19) comprises a reverse osmosis device (26) and first and second deionizing materials. The washing machine (11) comprises a container (13) for receiving the items (12) to be washed, and said container (13) is arranged with an inlet connected to the reservoir (20), so that the items (12) are washable inside the container (13) with the purified water. The system (10) further comprises a tank (24) for collecting used water from the container (13), wherein an inlet of the tank (24) is connected to an outlet of the container (13). The system (10) also comprises a sediment filter (28) for filtering off particulate solids from the used water, wherein the sediment filter (28) is arranged between the tank (24) and the water purification apparatus (19).

14 Claims, 5 Drawing Sheets

Figure 1:
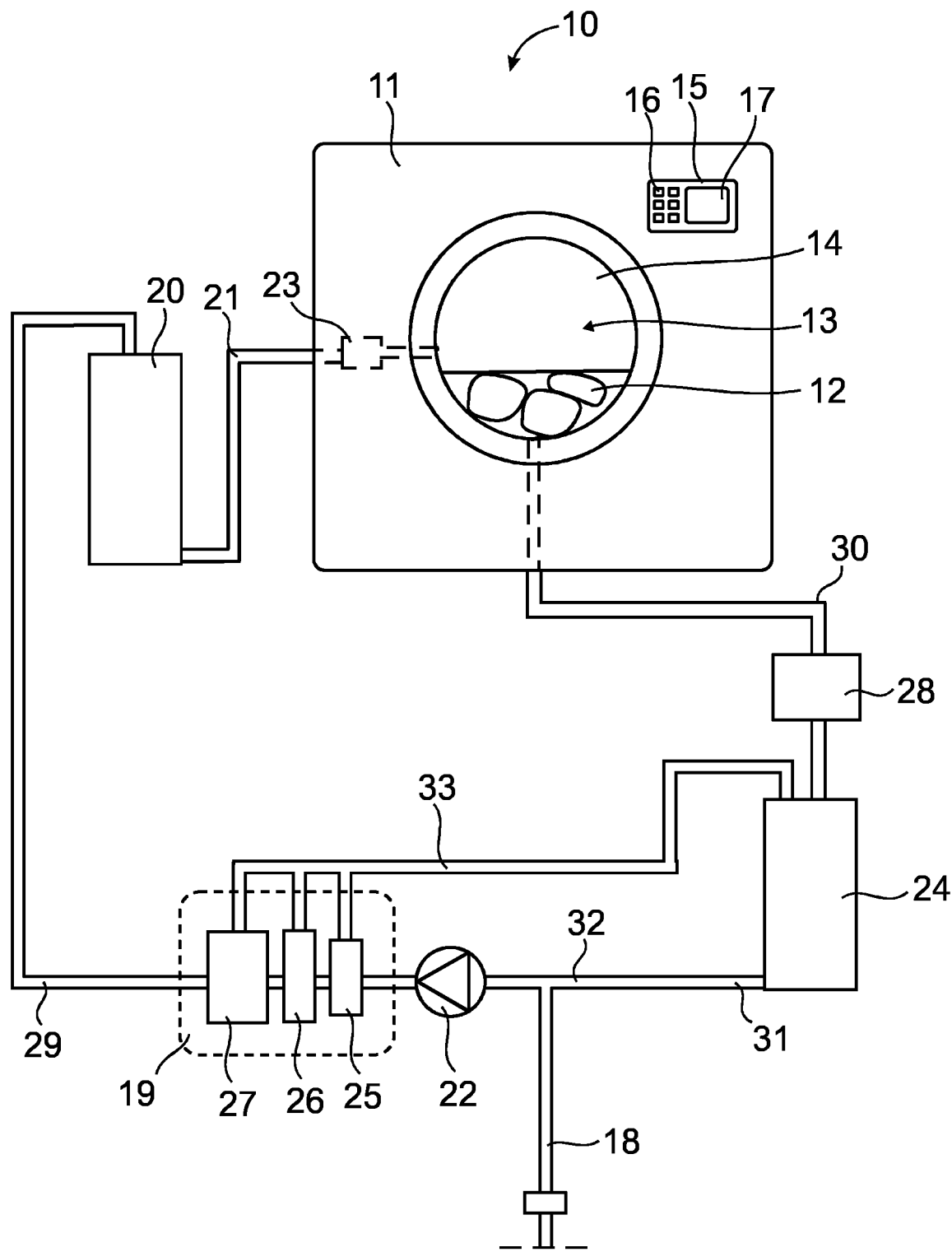

(51) Int. Cl.
  *D06F 35/00* (2006.01)
  *D06F 39/00* (2020.01)
  *D06F 39/08* (2006.01)
  *C02F 9/00* (2006.01)
  *D06F 105/34* (2020.01)
  *C02F 1/00* (2023.01)
  *C02F 1/28* (2023.01)
  *C02F 1/42* (2023.01)
  *C02F 1/44* (2023.01)
  *C02F 103/00* (2006.01)

(52) U.S. Cl.
  CPC ............... *C02F 1/42* (2013.01); *C02F 1/441* (2013.01); *C02F 2001/422* (2013.01); *C02F 2001/425* (2013.01); *C02F 2103/002* (2013.01); *C02F 2303/24* (2013.01); *C02F 2307/12* (2013.01); *D06F 39/006* (2013.01); *D06F 39/083* (2013.01); *D06F 39/10* (2013.01); *D06F 2105/34* (2020.02)

(58) Field of Classification Search
  CPC .......... C02F 2001/425; C02F 2103/002; C02F 2303/24; C02F 2307/12; C02F 1/283; C02F 2301/046; C02F 2001/427; B01F 35/006; B01F 2105/34; B01F 39/006; B01F 30/083; B01F 39/10; A47L 15/4291; D06F 35/006; D06F 2105/34; D06F 39/006; D06F 30/083; D06F 39/10
  See application file for complete search history.

(56) References Cited

U.S. PATENT DOCUMENTS

| 6,195,825 | B1 | 3/2001 | Jones |
| 7,000,437 | B2 * | 2/2006 | Raney ..................... D06F 39/00 |
| | | | 68/18 F |
| 2008/0148784 | A1 | 6/2008 | Ikematsu et al. |

FOREIGN PATENT DOCUMENTS

| DE | 102008042749 A1 | 4/2010 |
| EP | 0467028 A1 | 1/1992 |
| EP | 0578006 A1 | 1/1994 |
| EP | 1548173 A1 | 6/2005 |
| EP | 2848179 A1 | 3/2015 |
| GB | 2339578 A | 2/2000 |

* cited by examiner

SYSTEM AND A METHOD FOR WASHING ITEMS

This application is a national phase of International Application No. PCT/EP2018/058868 filed Apr. 6, 2018 and published in the English language, which claims priority to European Application No. 17165299.3 filed Apr. 6, 2017, both of which are hereby incorporated herein by reference.

FIELD OF THE INVENTION

The invention relates to a system and a method for washing items. More specifically, the present invention relates to a system and a method for washing items with purified water alone. This type of systems is generally used for doing laundry, including washing clothes and similar, wherein the system comprises a washing machine (also called laundry machine or clothes washer) and a water purification apparatus. Such washing machines are used as household appliances for domestic use as well as for larger scale laundry, such as in laundry facilities of apartment blocks, hospitals, etc., and for commercial and industrial laundry.

PRIOR ART

There is a system for washing items with purified water alone in the prior art, which is disclosed in EP2848179. EP2848179 discloses a system for washing items with purified water alone, comprising a washing machine and a water purification apparatus for producing the purified water. The water purification apparatus comprises at least one filter for filtering off particulate solids, a reverse osmosis device, and at least one deionizing filter. The system of EP2848179 further comprises a reservoir for storing purified water produced by the water purification apparatus, said reservoir being connected to said water purification apparatus and the washing machine, so that the items inside the washing machine are washable with the purified water.

Even though the system of EP2848179 has been found to work very well and eliminated the need for detergents and other washing chemicals for providing satisfactorily clean items, there is always a need to further reduce the environmental influence of systems for washing items.

SUMMARY OF THE INVENTION

An object of the present invention is to reduce the environmental influence of systems for washing items. The system and method according to the present invention result in cost efficient and environmentally friendly washing of items within industry as well as for domestic use. The system and method according to the present invention also has increased flexibility and can, e.g. result in efficient washing in a wider range of locations.

The present invention relates to a system for washing items with purified water alone, comprising a washing machine, a water purification apparatus for purifying water, at least one pump, and a reservoir for storing purified water produced by the water purification apparatus, wherein the water purification apparatus comprises a reverse osmosis device and first and second deionizing materials, wherein the washing machine comprises a container for receiving the items to be washed, and wherein the container is arranged with an inlet connected to the reservoir, so that the items are washable inside the container with the purified water, and wherein the container is arranged with an outlet for used water, characterised in that the system comprises a tank for collecting used water from the container, wherein an inlet of the tank is connected to the outlet of the container, and the system comprises at least one sediment filter for filtering off particulate solids from the used water, wherein the at least one sediment filter is arranged between the container and the water purification apparatus. Hence, the water used for washing is filtered and collected in the tank and then conducted to the water purification apparatus, which results in efficient recycling of water used for washing and repeated washing of the items with the same water. The combination of washing without detergents with recycling of the used water within the system results in a highly environmentally friendly washing. Also, the system according to the invention makes it possible to efficiently wash items in areas with limited access to water suitable for washing.

The water purification apparatus can comprise at least one filter for filtering off particulate solids, such as a sediment filter, a carbon filter and a softener filter. The filters can be arranged in said consecutive order and can be followed by the reverse osmosis device, the first deionizing material and the second deionizing material. This set up of water purification steps results in a highly purified water and effective use of the components of the water purification apparatus. The reverse osmosis device can be arranged between the filter and the deionizing filters, wherein the water is purified to a specified extent when conducted to the deionizing materials. This results in an effective purification and a long life-time of the deionizing materials.

The items, such as laundry, can be washed and cleaned satisfactorily by means of the purified water alone without use of detergents, tensides or similar chemicals. This results in cost savings and less negative influence on the environment. As no chemicals are added for washing the items or for preventing material in the water from depositing on the items, white laundry should be washed separately from coloured laundry.

After removal of coarse particles and fluff by the one or more sediment filters, the water can be purified exclusively by means of the sediment filter, the carbon filter, the softener filter, the reverse osmosis device, the first deionizing material and the second deionizing material. Hence, no additional filters or devices for removing ions, bacteria or similar is used then. Hence, a cost efficient and relatively simple water purification is provided, which operates basically in a mechanical manner as the water only is pumped through the water purification components and no additional energy, such as electricity, is added to said water purification components during the water purification.

The water purification apparatus can be arranged with a discharge outlet for material removed from the water, i.e. contaminated water containing particles and/or dissolved solids and/or bacteria and similar, which discharge outlet is connected to the tank, so that the discharge from the water purification apparatus is returned to the tank. The system can also comprise a tumble dryer having a waste water outlet connected to the tank. Hence, nearly all water can be retained in the system and the same water can be used for repeated washing of items. Then, the inlet is used only for adding water prior to an initial start-up and for refilling when required.

The present invention also relates to a method for washing items with purified water alone, comprising the steps of a) conducting water through a sediment filter (28) for filtering off particulate solids from the water, b) conducting said water to a tank (24), c) conducting the water from the tank (24) to a water purification apparatus (19) for purifying said water, d) purifying the water by means of reverse osmosis, e) conducting the water through first and second deionizing materials, f) after steps a)-e) conducting the purified water to a reservoir (20) for storing the purified water, g) conducting the purified water from the reservoir (20) to a container (13) of a washing machine (11) with the items (12) to be washed, h) washing the items (12) inside the container (13) with the purified water, and i) after step h) repeating steps a)-h) for the water used for washing.

Further characteristics and advantages of the present invention will become apparent from the description of the embodiments below, the appended drawings and the dependent claims.

SHORT DESCRIPTION OF THE DRAWINGS

Figure 2:
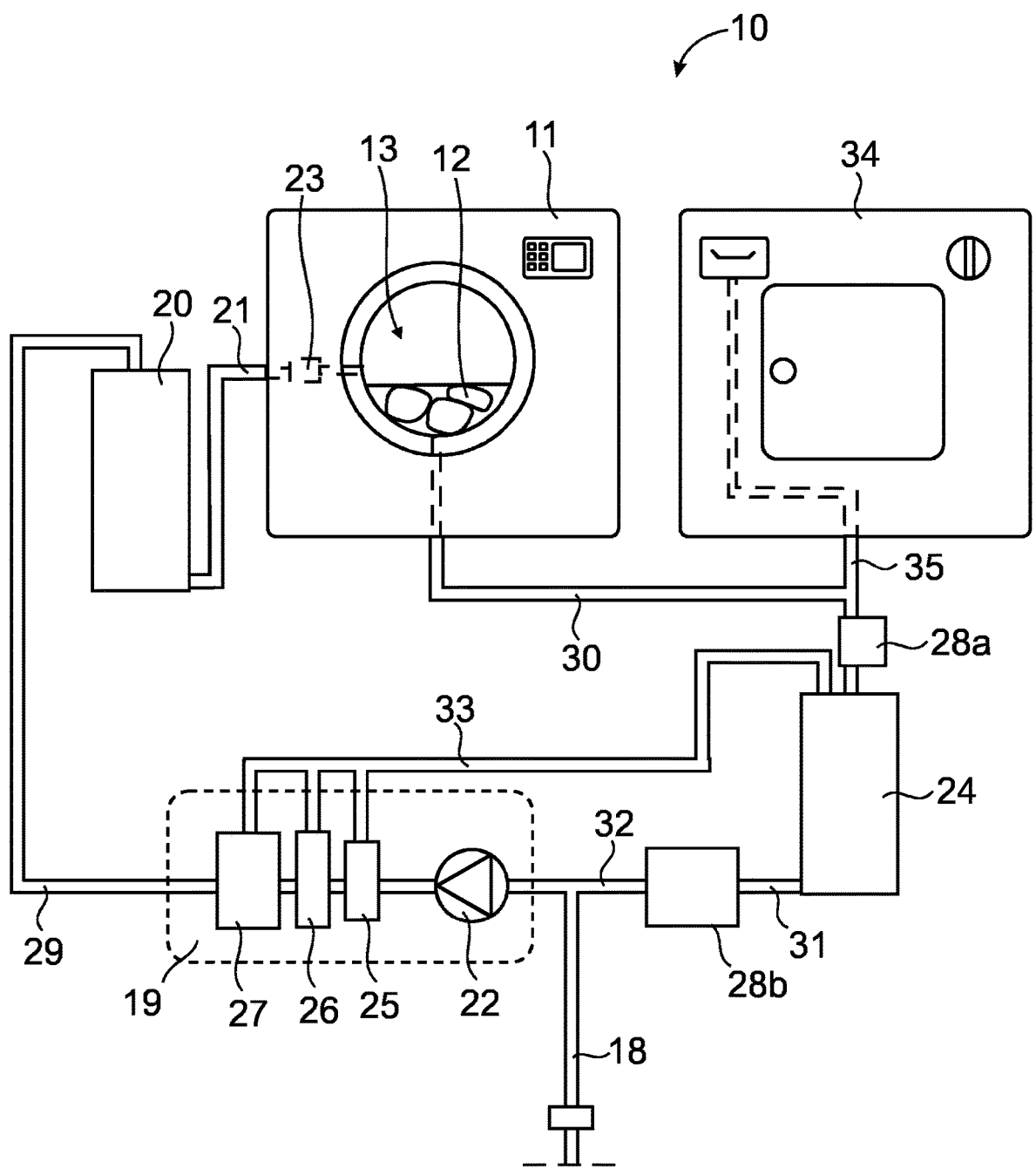
Figure 3:
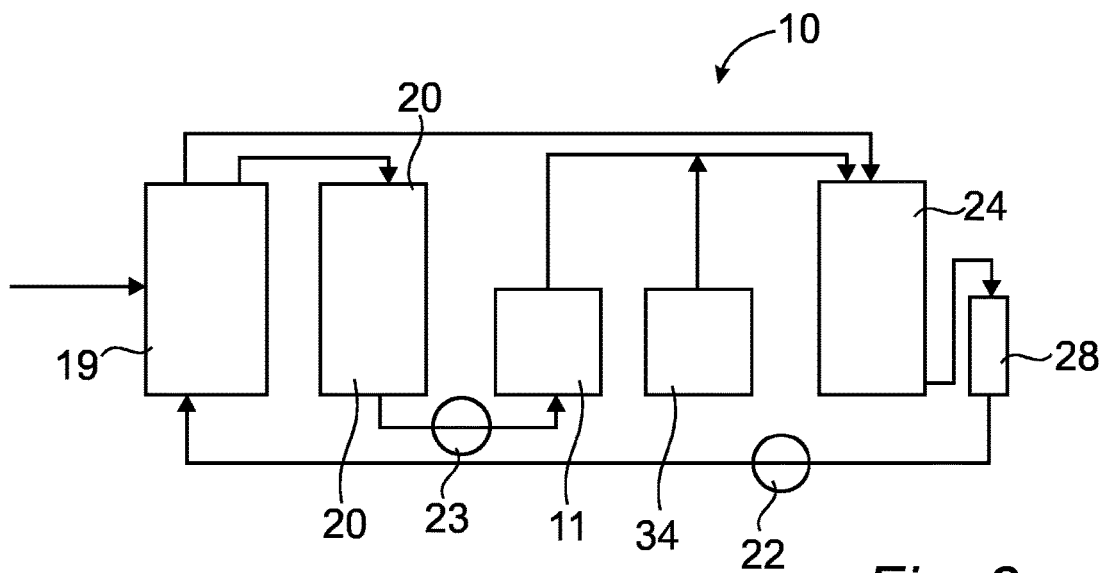
Figure 4:
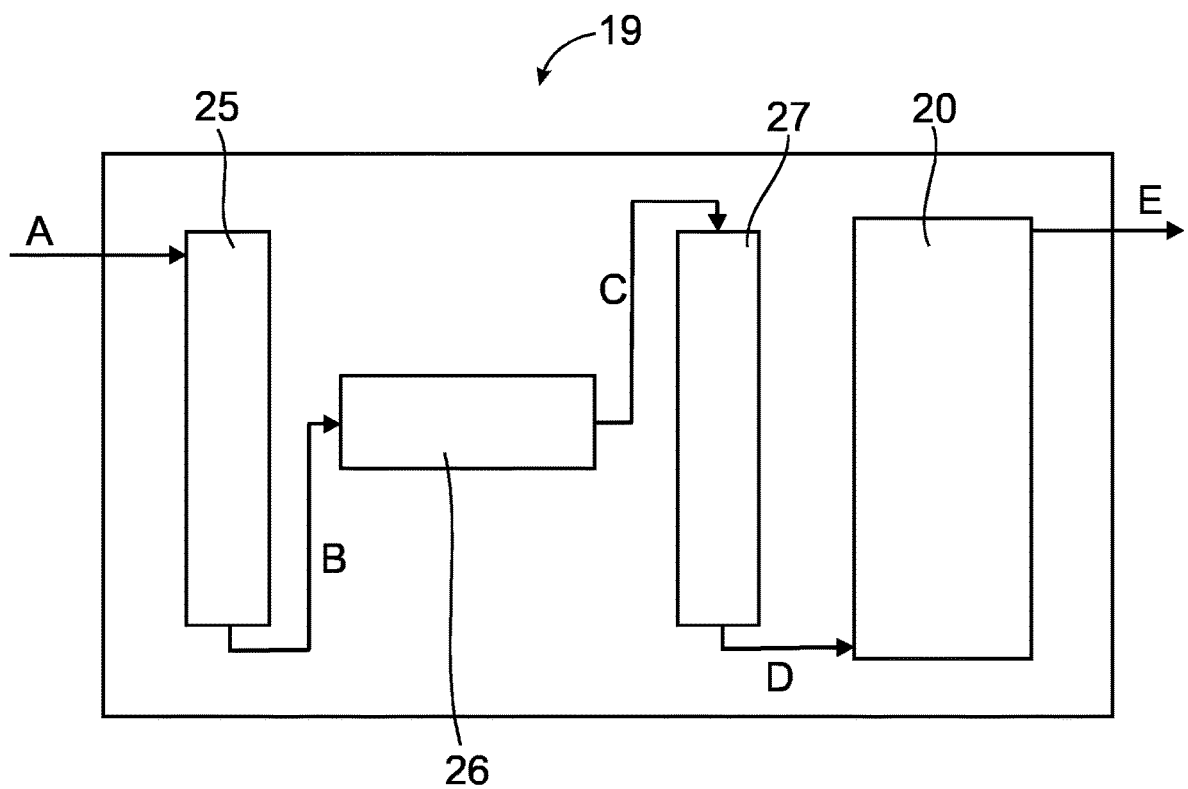
Figure 5:
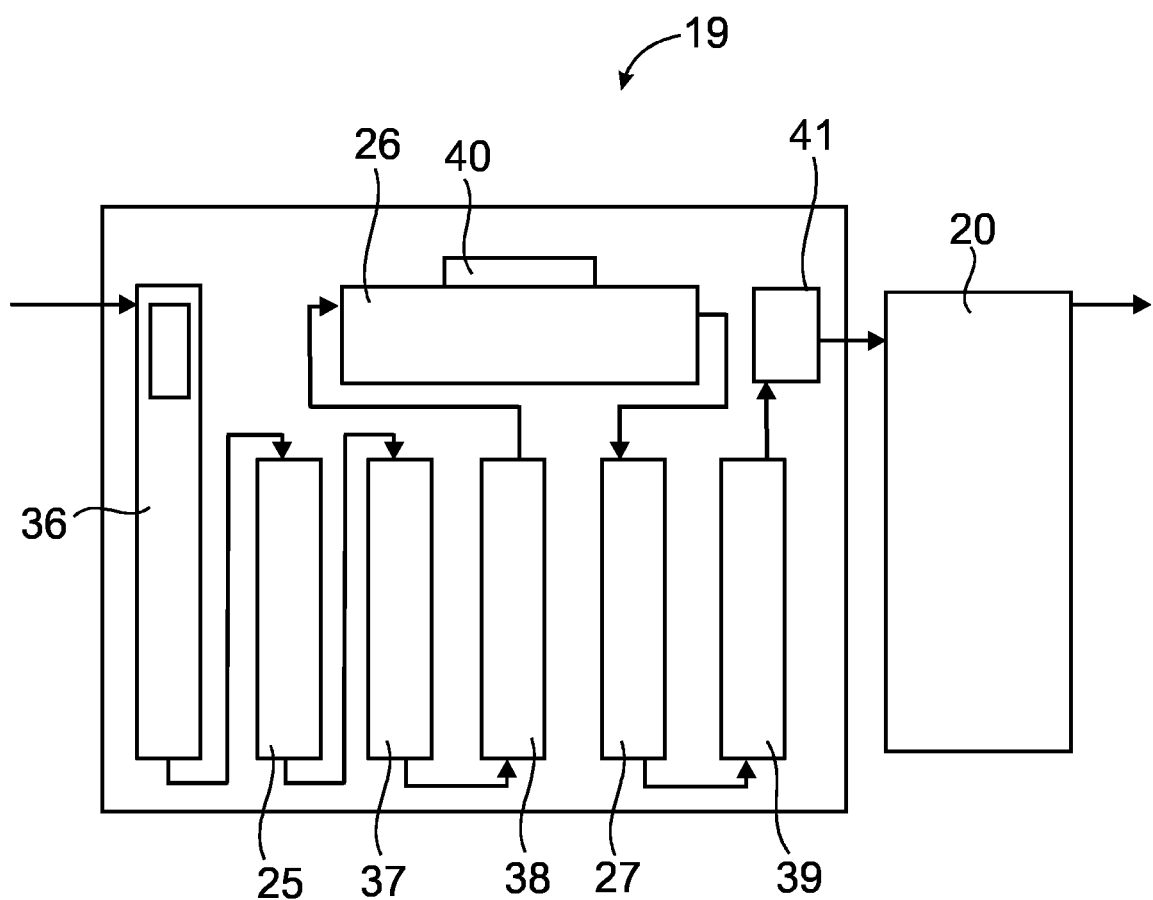
Figure 6:
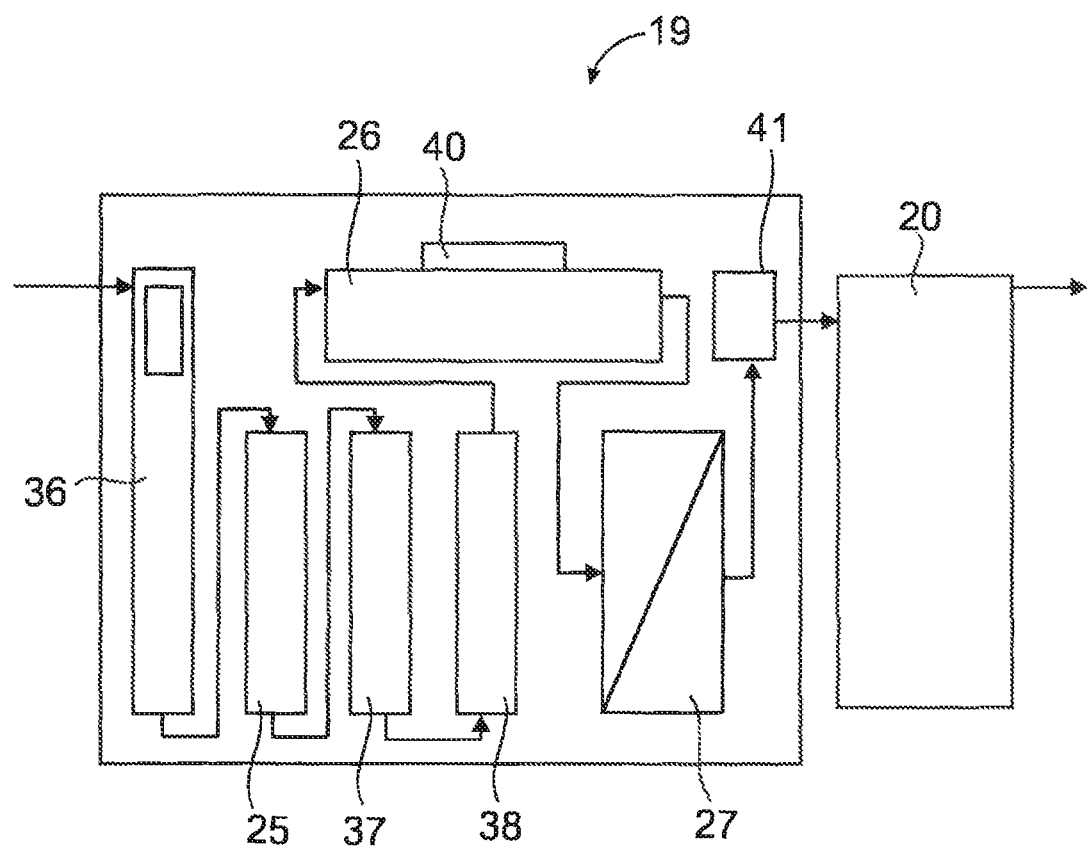

The invention will now be described more in detail with the aid of embodiments and with reference to the appended drawings, in which FIG. 1 is a schematic view of a system for washing items according to one embodiment of the invention, wherein the system comprises a washing machine, a tank for used water, a sediment filter, a pump, a water purification apparatus and a reservoir for purified water, FIG. 2 is a schematic view of a system for washing items according to one embodiment of the invention, wherein the system also comprises a tumble dryer, FIG. 3 is a schematic block diagram illustrating the system according to one embodiment, FIG. 4 is a schematic block diagram illustrating the water purifying apparatus of the system according to one embodiment, FIG. 5 is a schematic view illustrating a water purifying apparatus of the system according to another embodiment, and FIG. 6 is a schematic view illustrating a water purifying apparatus of the system according to yet another embodiment.

THE INVENTION

Referring to FIG. 1 a system 10 for washing items according to one embodiment is disclosed. The system 10 according to FIG. 1 comprises a washing machine 11 for washing items 12, such as clothes, linen and similar. For example, the system 10 is a household appliance for washing laundry. Hence, according to one embodiment the system 10 is arranged for simultaneously washing a plurality of items 12. According to one embodiment the system 10 is arranged for serving a plurality of households for washing laundry. For example, the system 10 includes one or more washing machines 11 of a laundry room in an apartment block or similar. The system 10 is arranged for washing items 12, such as laundry, without using tensides or detergents. For example, the system 10 is arranged for washing the items 12 without adding any chemicals, wherein the items 12 are washed in the washing machine 11 by water alone.

The washing machine 11 of the system 10, comprises a container 13 for accommodating the items 12 to be washed. The washing machine 11 comprises a door 14 for closing the container 13 and for allowing loading of items 12 into the container 13. For example, the container 13 is a rotating laundry drum of conventional type, wherein the items 12 to be washed are loaded into the container 13 and rotated therein. For example, the system 10 also comprises a control panel 15 for setting or controlling a washing program to be used. The control panel 15 is, for example, of conventional type and includes buttons 16 and a display 17 or similar means for controlling the system 10 or the washing machine 11 thereof.

The system 10 further comprises a water inlet 18, a water purification apparatus 19, a reservoir 20 and a tubing 21. The water purification apparatus 19 is schematically illustrated by means of dashed lines in FIG. 1. In addition, the system 10 comprises a pump 22 for pumping water to the water purification apparatus 19 and further to the reservoir 20. In the illustrated embodiment, the system 10 also comprises a pumping device 23 for pumping water from the reservoir 20 to the container 13 for washing items 12 therein. For example, the pumping device 23 is part of the washing machine 11 and is illustrated by means of dashed lines in FIG. 1. The system 10 further includes a tank 24

The inlet 18 is arranged for introducing water into the system 10. For example, the water inlet 18 is arranged to be connected to a water source, such as a municipal water supply network or similar for allowing water, such as conventional tap water, from said water supply network to enter the system 10. Hence, according to one embodiment example, the system 10 is connected to the municipal water supply network for adding water to the system when required. Alternatively, the inlet 18 is arranged for filling water into the system 10 in another way, such as by means of filling from a container or similar. The water inlet 18 is arranged for conducting water from the water source and into the system 10 before the water purification apparatus 19, e.g. by means of the pump 22. For example, the inlet 18 is connected to the water purification apparatus 19. Alternatively, the inlet 18 is arranged for introducing water into the system 10 through the tank 24.

The water purification apparatus 19 is arranged for purifying water from the tank 24 and produce purified water. For example, the water purification apparatus 19 is also arranged for purifying water from the water inlet 18 and produce the purified water, which is described more in detail below. The water purification apparatus 19 is connected to the reservoir 20, which reservoir 20 is arranged for storing purified water, i.e. the water purified by the water purifying apparatus 19. The reservoir 20 is connected to the washing machine 11 and its container 13 through the tubing 21, wherein purified water stored in the reservoir 20 can be conducted to the container 13 of the washing machine 11 on demand for washing items 12 therein. The water purification device 19 comprises a filter 25, a reverse osmosis device 26 and a deionizing filter 27 having a first deionizing material and a second deionizing material. In addition, the system 10 also includes at least one sediment filter 28. The sediment filter 28 is arranged between the washing machine 11 and the water purification apparatus 19, such as between the washing machine 11 and the tank 24. The sediment filter 28 is arranged for filtering off textile residues, debris, etc. For example, the sediment filter 28 is replaceable or can be emptied. For example, the sediment filter 24 is a roughing filter. According to one embodiment, the sediment filter 28 is arranged for filtering off particles having a size of down to 30 microns or down to 10 microns. For example, the sediment filter 28 is arranged for allowing a relatively high flow of the water through it without any substantial change of the water pressure. For example, the sediment filter 28 is of a different type then the filter 25 of the water purification apparatus 19. According to one embodiment, the sediment filter 28 is a bag filter. For example, the sediment filter 28 is a bag filtration 10-30 micron.

Initially, water is supplied to the system 10 through the inlet 18. For example, water from a municipal water supply network is added to the system 10 through the inlet 18. In the illustrated embodiment, said water is supplied to the system 10 between the tank 24 and the water purification apparatus 19, such as between the first sediment filter 28*a* and the water purification apparatus 19. Alternatively, said water is supplied to the tank 24. For example, the water is conducted to the water purification apparatus 19 by means of the pump 22. For example, water added to the system 10 is conducted to an inlet of the water purification apparatus 19. Then, the water introduced into the system 10 is purified by passing, in consecutive order, the filter 25, the reverse osmosis device 26 and the deionizing filter 27 and the purified water is then conducted to the reservoir 20 for storing of the purified water prior to use in the washing machine 11. For example, the purified water is conducted from an outlet of the water purification apparatus 19 to an inlet of the reservoir 20 through a pipe 29. Then, when items 12 are to be washed in the washing machine 11, purified water is conducted from the reservoir 20 to the container 13 of the washing machine 11, such as through the tubing 21 by means of the pumping device 23, wherein the items 12 are washed with the purified water alone without adding any detergents or other chemicals to the container 13. After washing the water used for washing is conducted to the tank 24, such as directly to the tank 24 or to the tank 24 via the sediment filter 28. Hence, the used water is conducted from an outlet of the container 13 to an inlet of the tank 24, e.g. through a pipe 30, so that used water is collected and stored in the tank 24. Then, according to the illustrated embodiment, used water is conducted from the tank 24 to the sediment filter 28 for removing particulate solids from the used water. Hence, the water is conducted from an outlet of the tank 24 to an inlet of the sediment filter 28, e.g. through a pipe 31. After conducting the used water through the sediment filter 28 the filtered water is conducted to the water purification apparatus 19 for transforming used water to purified water. For example, the filtered water is conducted from an outlet of the sediment filter 28 to the inlet of the water purification apparatus 19, e.g. through a pipe 32. As mentioned above, the sediment filter 28 alternatively is arranged between the container 13 and the tank 24, wherein the used water is conducted through the sediment filter 28, e.g. by means of a pump (not illustrated) and to the tank 24 and, then, from the tank 24 to the water purification apparatus 19. Water used for washing items 12 in the washing machine 11 is conducted from the container 13 to the water purification apparatus 19 through the sediment filter 28 and the tank 24. Hence, the water used for washing items 12 in the washing machine 11 is recycled and used again for washing items 12 in the container 13 without adding any detergents or other chemicals to the washing process.

In the illustrated embodiment, the discharge from the water purification apparatus 19, i.e. the material filtered off and removed from the purified water, is conducted to the tank 24, e.g. through a pipe 33. Hence, water containing particles, salts and other impurities separated from the purified water during the water purification process is conducted to the tank 24 for subsequent further processing. Hence, used water containing undesirable material is conducted to the water purification apparatus 19, e.g. through the sediment filter 28, wherein the water filtered off in the water purification apparatus 19 is returned to the tank 24 for a repeated filtering and purification process. Hence, the discharge water from the water purification apparatus 19 is maintained in the system 10 and recycled within the system 10.

With reference to FIGS. 2 and 3 the system 10 also comprises an optional drying apparatus in the form of a tumble dryer 34 for drying the items 12 after washing in the washing machine 11. Hence, after washing the items 12 they are transferred to the tumble dryer 34, for example, in a conventional manner, for drying. Water extracted from the items 12 during the drying process in the tumble dryer 34 is collected, e.g. in a conventional manner in a discharge water collector of the tumble dryer 34, and conducted to the tank 24. Hence, the tumble dryer 34 is connected to the tank 24 for conducting water extracted from the items 12 inside the tumble dryer 34 to the tank 24. For example, a discharge water outlet of the tumble dryer 34 is connected to the inlet of the tank 24, e.g. through a pipe 35. In the embodiment of FIG. 2, the water in the system 10 is recycled from both the washing machine 11 and the tumble dryer 34, wherein practically all water used for washing the items 12 is recycled and the same amount of water can be used repeatedly for washing a plurality of batches of laundry in the washing machine 11. Then, the inlet 18 for adding water to the system 10 is used for adding an initial amount of water to the system 10 and for refilling of water into the system when required.

In the embodiment of FIG. 2 the system 10 comprises a first sediment filter 28*a* and an optional second sediment filter 28*b*. Of course, the embodiment of FIG. 2 with the first and second sediment filters 28*a*, 28*b* is also applicable to the embodiment of FIG. 1. The first sediment filter 28*a* is arranged between the washing machine 11 and the water purification apparatus 19, such as between the washing machine 11 and the tank 24. In the embodiment of FIG. 2, both the first and second sediment filters 28*a*, 28*b* are arranged between the washing machine 11 and the water purification apparatus 19, wherein the first sediment filter 28*a* is arranged between the washing machine 11 and the tank 24, and the second sediment filter 28*b* is arranged between the tank 24 and the filter 25. The sediment filters 28*a*, 28*b* are arranged for filtering off textile residues, debris, etc. For example, the sediment filters 28*a*, 28*b* are replaceable or can be emptied. For example, the sediment filters 28*a*, 28*b* are roughing filters or at least the first sediment filter 28*a* is a roughing filter. According to one embodiment, the first sediment filter 28*a* is arranged for filtering off particles having a size of down to 30 microns or down to 10 microns. For example, at least the first sediment filter 28*a* is arranged for allowing a relatively high flow of the water through it without any substantial change of the water pressure. For example, at least the first sediment filter 28*a* is of a different type than the filter 25 of the water purification apparatus 19. According to one embodiment, the first sediment filter 28*a* is a bag filter. For example, the first sediment filter 28*a* is a bag filtration 10-30 micron. For example, the optional second sediment filter 28*b* is arranged for filtering off particles having a size of down to 5 microns.

With reference to FIG. 4 the water purification apparatus is illustrated with the reservoir 20 in a simplified manner according to one embodiment. The water purification apparatus 19 is connected to the water inlet 18 for conducting water from the water supply network or similar to the filter 25, which is illustrated by means of the arrow A in FIG. 4. The filter 25 is arranged for filtering off particulate solids. For example, the filter 25 is a sediment filter. For example, the filter 25 is also arranged for removing chlorine and for softening the water. The filter 25 is, for example, arranged as a filter pack including a plurality of filters, such as one or more sediment filters, carbon filters and softener filters. The water is then conducted to the reverse osmosis device 26, which is illustrated by means of the arrow B in FIG. 4, for removing particles from the water and purifying the water further. The water is then conducted to the deionizing filter 27, which is illustrated by means of the arrow C in FIG. 4, for deionizing the water. The deionizing filter 27 is a double deionizing filter, comprising first and second deionizing materials for both anion exchange and cation exchange. The deionizing filter 27 is a mixed bed filter comprising a mixture of the first and second deionizing materials. Alternatively, the deionizing filter 27 is a two-bed filter, wherein the two deionizing materials are separated. Then the purified water is conducted to the reservoir 20, which is illustrated by means of arrow D in FIG. 4. Purified water can be conducted from the reservoir 20, which is illustrated by means of the arrow E, for washing the items 12 in the container 13 as described above.

Conductivity is one measure to determine the degree of purity of water. Conductance meters can be used for such determinations. Conductivity is given as µS/cm (microSiemens per centimeter). Tap water can probably have a conductivity of 700-900 µS/cm. Values for distilled water has been indicated to be between 0.5 and 5 µS/cm. For example, a conventional TDS meter indicates the total dissolved solids (TDS) of a solution, i.e. the concentration of dissolved solids in it. Since dissolved ionized solids, such as salts and minerals, increase the conductivity of a solution, a TDS meter measures the conductivity of the solution, estimates the total dissolved solids from that and displays it as ppm (parts per million). Tap water normally has between 220 and 350 ppm measured with a conventional TDS meter.

The water purification apparatus 19 is arranged to provide purified water having less than 10 ppm, such as less than 5 ppm or 0-2 ppm measured with a TDS meter, e.g. at 25° C. For example, the water purification apparatus 19 is arranged for providing purified water having a conductivity of less than 0.5 µS/cm, such as less than 0.1 µS/cm. Hence, the purified water has substantially no charge and substantially no conductivity. For example, the water purification apparatus 19 is arranged for providing water with less conductivity than distilled water.

With reference to FIG. 5 another embodiment of the water purification apparatus 19 of the system 10 is illustrated. In the embodiment of FIG. 5 the water purification apparatus 19 comprises a heater 36, the filter 25, a carbon filter 37, a softener filter 38, the reverse osmosis device 26, a first deionizing filter 27 and a second deionizing filter 39.

The heater 36 is arranged for heating incoming water, such as the water from the water inlet 18 and/or the water from the tank 24, which may have been used for previous washing of the items 12. Hence, the heater 36 is arranged for heating the water before purification thereof. The heater 36 is, for example, arranged for heating the water to 20-38° C., 20-29° C. or 25° C. The heater 36 is, for example, an immersion heater, such as a Backer 3800W immersion heater. For example, the heater 36 is arranged between the water inlet 18 and the filter 25 and/or between the tank 24 and the filter 25. In one embodiment, the heater 38 is arranged between the sediment filter 28 and the filter 25, or between the second sediment filter 28b and the filter 25.

In the embodiment of FIG. 5, the filter 25 is a sediment filter for filtering off particles having a size of down to 5 microns. The carbon filter 37 is arranged for filtering off particles and for removing chlorine if necessary. For example, the carbon filter 37 is a carbon filter for filtering off particles of a size down to 10 microns. The softener filter 38 is, for example, a phosphate filter, for removing chemical particles from the water, such as chlorine. Alternatively, the softener filter 38 is another carbon filter or a combined carbon/softener filter for softening the water.

The water purification apparatus 19 according to FIG. 5 also comprises at least one booster pump 40, such as an Aquatec 8800, for pressurizing the reverse osmosis device 26 to a working pressure of, for example, 552-1034 kPa (80-150 psi), such as 689 kPa (100 psi). For example, the booster pump 40 is arranged between the sediment filter 25 or the softener filter 38 and the reverse osmosis device 26. For example, the booster pump 40 is arranged between the softener filter 38 and the reverse osmosis device 26. Alternatively, the pump 22 of the system 10 is used to provide a suitable working pressure of the reverse osmosis device 26. Alternatively, other types of pumps are used to provide suitable working pressure for the reverse osmosis device 26.

In the embodiment of FIG. 5, the reverse osmosis device 26 is arranged between the softener filter 38 and the first deionizing filter 27. The reverse osmosis device 26 is arranged for further removal of particles in the water. The reverse osmosis device 26 is, for example, arranged for removing bacteria, viruses and chemicals from the water. For example, the reverse osmosis device 26 is or includes an Axeon—HF4 Series Membrane Element, such as a HF4-4014 from Axeon Water Technologies. The temperature of the reverse osmosis device 26 or the water pumped through it is, e.g. 4-29° C., such as around 25° C. For example, the pressure inside the reverse osmosis device 26 is 552-1034 kPa (80-150 psi), such as 689 kPa (100 psi). The size and number of reverse osmosis devices 26 and booster pumps 40 may vary depending on the amount of purified water to be produced. For example, the water purification apparatus 19 according to one embodiment produces about 1100 litres per day, i.e. 0.79 l/min. For example, the water purification apparatus 19 is arranged for producing 0.2-5 l/min, 0.5-2 l/min or 0.5-1 l/min.

The first and second deionizing filters 27, 39 are arranged for deionizing and further purifying the water. According to the embodiment of FIG. 5 the deionizing filters 27, 39 are arranged between the reverse osmosis device 26 and the reservoir 20 for purified water, wherein water from the reverse osmosis device 26 is conducted to the deionizing filters 27, 39. The first and second deionizing filters 27, 39 are, for example, a double filter, such as US Water Aquapurion DI-BB220 Dual 4.5"×20" Filtration System. The deionizing filters 27, 39 are, for example, arranged as interchangeable units. Alternatively, the deionizing filters 27, 39 comprise a tank with replaceable deionizing materials.

The reservoir 20 is connected to the deionizing filters 27, 39, for receiving purified water therefrom. According to the illustrated embodiment a water purity meter 41, such as a TDS meter, is arranged between the deionizing filters 27, 40 and the reservoir 20 for checking the purity of the water before conducting the purified water to the reservoir 20. If the purified water passes the purity control, which can be set to a predetermined value, the purified water is conducted to the reservoir 20. However, if the water contains contaminants, such as total dissolved solids, exceeding a predetermined threshold, the water will be returned to a previous step of purification or to the tank 24. For example, the TDS meter is a HM Digital DM-1 Digital TDS Monitor. Alternatively, a conductivity meter is arranged between the deionizing filters 27, 39 and the reservoir 20 for purity control. The water is, for example, at a temperature of 25° C. during the measurement with the water purity meter 41.

The reservoir 20 is arranged for storing purified water. The reservoir 20 is, for example, a pressure tank. For example, the reservoir 20 is a pressure tank with a pressure of 41 to 48 kPa (5 to 7 psi) for obtaining a water pressure similar to that of the water supply network. For example, the reservoir 20 is arranged for providing a water pressure similar to the water pressure of the water entering the water purification apparatus 19. The reservoir 20 is dimensioned according to the application. For a system 10 in the form of a household appliance serving a single family the reservoir 20 is, for example, a 20-200 l tank. If the system 10 is for commercial use or serving a plurality of households the reservoir is, for example, a 100-1000 l tank. For example, the reservoir 20 is a 10-1000 l tank, a 20-500 l tank or a 50-100 l tank.

With reference to FIG. 6 another embodiment of the water purification apparatus 19 of the system 10 is illustrated. In the embodiment of FIG. 6 the water purification apparatus 19 comprises the heater 36, the filter 25, the carbon filter 37, the softener filter 38, the reverse osmosis device 26, the deionizing filter 27 having the first deionizing material and the second deionizing material, wherein the first and second deionizing materials are arranged in a single vessel, e.g. as a mixed bed deionizing filter, in which the first and second deionizing materials are mixed. For example, the deionizing materials are arranged in a pressure vessel. For example, the first deionizing material is a cation-exchange resin, wherein the second deionizing material is an anion-exchange resin. For example, the first deionizing material is a material with hydrogen ions available for ion exchange, wherein the second deionizing material is a material with hydroxyl ions available for ion exchange. Hence, deionization is made by ion exchange, which takes place by only pumping water through the deionization filter 27, i.e. without adding electrical power from an external power source or a battery. Apart from the water flow and the pressure applied by the pump 22 or pumps of the system 10 no further energy is added to the system during the purification process. For example, all filters 28, 28a, 28b, 25, 37, 38, the reverse osmosis device 26 and the deionization filter 27 operate without adding any further energy during purification of the water than the pumping of the water. In that sense, the water purification is mechanical.

The invention claimed is:

1. A system for washing items with purified water and without detergents, comprising a washing machine, a water purification apparatus for purifying water, at least one pump, and a reservoir for storing purified water produced by the water purification apparatus, wherein the water purification apparatus comprises a reverse osmosis device and first and second deionizing materials, wherein the washing machine comprises a container for receiving the items to be washed, and wherein the container is arranged with an inlet connected to the reservoir, so that the items are washable inside the container with the purified water, and wherein the container is arranged with an outlet for used water, wherein the system comprises a tank for collecting used water from the container, wherein an inlet of the tank is connected to the outlet of the container, and the system comprises a sediment filter in the form of a bag filter for filtering off particulate solids having a size of down to 30 microns from the used water, wherein the sediment filter is arranged between the container and the water purification apparatus.

2. The system according to claim 1, wherein the water purification apparatus comprises at least one filter for filtering off particulate solids, and wherein the reverse osmosis device is arranged between the filter and the deionizing materials.

3. The system according to claim 2, wherein the first deionizing material is a cation-exchanger and the second deionizing material is an anion-exchanger.

4. The system according to claim 1, wherein the sediment filter is arranged between the container and the tank.

5. The system according claim 1, wherein a discharge outlet from the water purification apparatus is connected to the tank.

6. The system according to claim 1, wherein all components included for the purification of water are operated mechanically.

7. The system according to claim 1, comprising a tumble dryer having a waste water outlet connected to the tank.

8. A method for washing items with purified water, comprising the steps of
   a) conducting water through a sediment filter in the form of a bag filter for filtering off particulate solids having a size of down to 30 microns from the water,
   b) conducting said water to a tank,
   c) conducting the water from the tank to a water purification apparatus for purifying said water,
   d) purifying the water by means of reverse osmosis,
   e) conducting the water through first and second deionizing materials,
   f) after steps a)-e) conducting the purified water to a reservoir for storing the purified water,
   g) conducting the purified water from the reservoir to a container of a washing machine with the items to be washed,
   h) washing the items inside the container with the purified water and without detergents, and
   i) after step h) repeating steps a)-h) for the water used for washing.

9. The method according to claim 8, comprising the step of, after steps a) and b) and before step d), conducting the water through at least one filter for filtering off particulate solids.

10. The method according to claim 8, comprising the step of, in step e) deionizing the water by cation-deionization and anion-deionization.

11. The method according to claim 8, comprising the steps of performing step d) before step e).

12. The method according to claim 9, comprising the step of conducting a discharge from the at least one filter, the reverse osmosis device and the deionizing materials to the tank.

13. The method according to claim 8, comprising the steps of heating the water before pumping the water through the reverse osmosis device and the deionizing materials, and, apart from heating and pumping, adding no further energy to the process of purifying the water during the purification thereof.

14. The method according to claim 8, comprising the step of conducting waste water from a tumble dryer to the tank.

\* \* \* \* \*